(12) United States Patent
Izumi et al.

(10) Patent No.: US 6,487,038 B1
(45) Date of Patent: Nov. 26, 2002

(54) RECORDING DISK DRIVE AND METHOD OF ASSEMBLING THE SAME

(75) Inventors: Mitsuhiro Izumi, Kawasaki (JP); Hiroyuki Iwahara, Kawasaki (JP); Keiji Aruga, Kawasaki (JP); Shinji Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/436,928

(22) Filed: Nov. 9, 1999

(30) Foreign Application Priority Data

Jun. 8, 1999 (JP) .......................................... 11-160407

(51) Int. Cl.[7] .............................................. G11B 17/02
(52) U.S. Cl. ..................................................... 360/97.02
(58) Field of Search ............................ 360/97.02, 97.03

(56) References Cited

U.S. PATENT DOCUMENTS 5,696,649 A * 12/1997 Boutaghou ............... 360/97.03
5,898,545 A * 4/1999 Schirle ..................... 360/97.02

FOREIGN PATENT DOCUMENTS

JP          5357009          5/1978

* cited by examiner

Primary Examiner—Robert S. Tupper
(74) Attorney, Agent, or Firm—Greer, Burns & Crain, Ltd.

(57) ABSTRACT

A recording disk drive includes a shroud wall spaced from a peripheral end of the recording disk by a gap equal to or smaller than 0.5 mm. A rectification groove is formed in the shroud wall at a position adjacent an area opposed to the peripheral end of the recording disk. Reduction in gap between the peripheral end of the recording disk and the shroud wall serves to reduce the amplitude of the flutter to be induced in the rotating recording disk. Moreover, as the gap gets smaller, the flutter reduces at a higher rate in response to increase of the depth of the rectification groove. Specifically, if the gap between the peripheral end of the recording disk and the shroud wall is set equal to or smaller than 0.5 mm, the groove can be made shallower so as to still efficiently suppress the flutter of the rotating recording disk.

8 Claims, 4 Drawing Sheets

US 6,487,038 B1

RECORDING DISK DRIVE AND METHOD OF ASSEMBLING THE SAME

BACKGROUND OF THE INVENTION

1. Field of the Invention

The present invention relates to a recording disk drive such as a hard disk drive (HDD), and in particular, to a recording disk drive comprising a recording disk and a shroud wall spaced from the peripheral end of the recording disk.

2. Description of the Prior Art

It is well known in the field of HDDs that turbulence within the enclosure of the magnetic recording disk causes a flutter of the rotating magnetic recording disk. Such turbulence is usually induced by the rotation of the magnetic recording disk. For example, Japanese Patent Laid-open No. 53-57009 discloses an annular plate surrounding the magnetic recording disk so as to reduce the flutter. The disclosed technique suggests that the outer periphery of the magnetic recording disk is spaced apart from the inner wall of the annular plate by 1.0 mm. Reduction of the flutter is in general required to avoid collision of the flying head slider against the surface of the rotating magnetic recording disk in the HDD.

The magnetic recording disk has got smaller in size. Reduction in size of the magnetic recording disk is accompanied with reduction in the amplitude of the flutter. In addition, the behavior of the flying head slider has got a higher stability, which serves to avoid variation in the flying height of the flying head slider above the surface of the magnetic recording disk. Accordingly, less probability can be found in collision of the flying head slider against the magnetic recording disk in the HDD in recent years.

There is still a greater demand for a higher storage density to a magnetic recording disk. The storage density can be improved by reducing spaces between the adjacent recording or data tracks on the magnetic recording disk. Reduction in spaces between the data tracks cannot be considered without taking flutter of the rotating magnetic recording disk into account. Flutter induces sway of the magnetic recording disk at the outer periphery in the direction orthogonal to the surface of the disk, namely, the longitudinal direction. Such sway induces not only the collision of the flying head slider against the magnetic recording disk but also the lateral shift of the data tracks which leads to failure in positioning the flying head slider above the target data track. Specifically, the flutter of the rotating magnetic recording disk is a factor to obstruct reduction in spaces between the adjacent data tracks. Heretofore, no consideration has been made on appropriate conditions for effectively reducing the flutter of a smaller magnetic recording disk such as a 3.5 inches or 2.5 inches magnetic disk in an HDD.

SUMMARY OF THE INVENTION

It is accordingly an object of the present invention to provide a recording disk drive comprising a shroud wall capable of effectively reducing the flutter of a recording disk.

According to a first aspect of the present invention, there is provided a recording disk drive comprising: a recording disk; a shroud wall spaced from an peripheral end of the recording disk by a gap equal to or smaller than 0.5 mm; and a rectification groove formed in the shroud wall at a position adjacent an area opposed to the peripheral end of the recording disk.

The present inventors have found out that reduction in gap between the peripheral end of the recording disk and the shroud wall serves to reduce the amplitude of the flutter to be induced in the rotating recording disk. Moreover, as the gap gets smaller, the flutter reduces at a higher rate in response to increase of the depth of the rectification groove. Specifically, if the gap between the peripheral end of the recording disk and the shroud wall is set equal to or smaller than 0.5 mm, the groove can be made shallower so as to still efficiently suppress the flutter of the rotating recording disk.

The rectification groove preferably has a depth equal to or smaller than 2 mm. The present inventors have found from their unique observation that a rectification groove of a depth larger than 2 mm hardly serves to reduce the flutter of the rotating recording disk.

The recording disk drive may further comprise an enclosure enclosing the recording disk, and a shroud member inserted into the enclosure to define the shroud wall with the rectification groove. According to the arrangement, it is unnecessary to form the rectification groove directly on the enclosure, so that the process of producing the recording disk drive may be simplified.

According to a second aspect of the present invention, there is provided a recording disk drive comprising: a recording disk; an enclosure enclosing the recording disk; a shroud member inserted into the enclosure so as to keep a gap equal to or smaller than 0.5 mm to an peripheral end of the recording disk; and a rectification groove formed in the shroud member at a position adjacent an area opposed to the peripheral end of the recording disk.

A recording disk drive of the second aspect may achieve the aforementioned advantages in the same manner as the first aspect. In addition, the shroud member employed in the second aspect may serve to facilitate the process of producing the recording disk drive.

Furthermore, a method of assembling the aforementioned recording disk drive, may comprise: preparing an enclosure of a recording disk; forming a groove on an inner surface of a tubular material having an inside diameter larger than an outside diameter of the recording disk, the groove extending in a circumferential direction of the tubular material; cutting an annular member off the tubular material, the annular member including the groove formed on its inner surface; and setting the annular member in the enclosure so as to oppose the inner surface of the annular member to a peripheral end of the recording disk by a predetermined gap. The peripheral end of the recording disk is opposed to the inner surface at an area adjacent the groove.

It should be noted that the present invention may be applied not only to a magnetic recording disk drive such as a hard disk drive, for example, but also to an optical recording disk drive employing an optical recording disk such as a compact disk (CD, CD-R, CD-RW) and a digital video disk (DVD), as well as a magneto-optical disk drive employing a magneto-optical disk (MO).

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
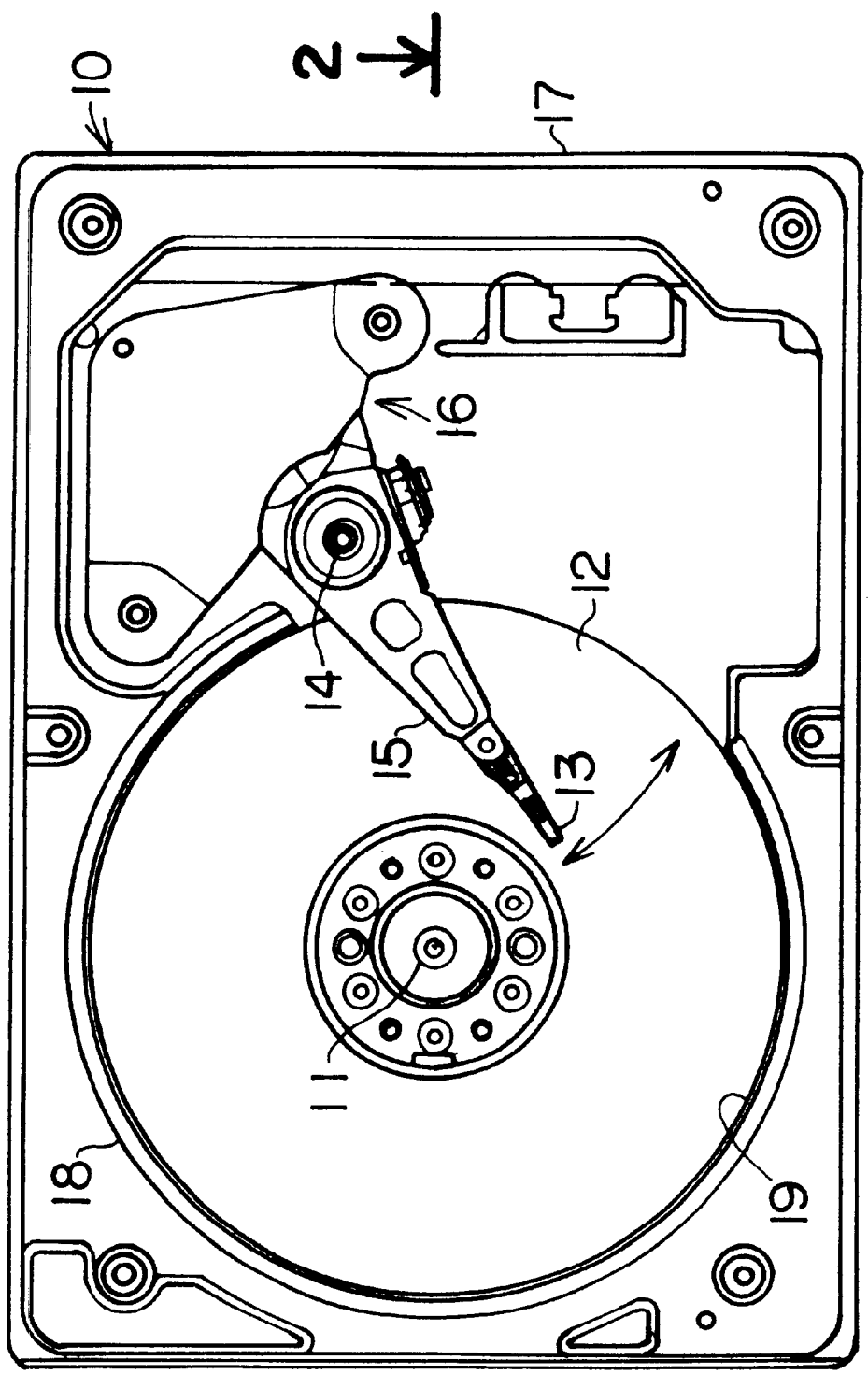
FIG. 1 is a plan view schematically illustrating the structure of a hard disk drive (HDD)

FIG. 1 illustrates a hard disk drive unite (HDD) 10 as a recording disk drive according to the present invention. The HDD 10 comprises a plurality of magnetic recording disks 12, ten disks for example, capable of rotating about a support axis 11, and corresponding flying head sliders 13 opposed to the front and back surfaces of the respective magnetic recording disks 13. The flying head sliders 13 are fixed at the tip ends of carriage arms 15 which swing around a common support axis 14. When information is to be written into or read out of the magnetic recording disk 12, an actuator 16 comprising a magnetic circuit serves to drive the carriage arms 15 for swinging movement, so that the flying head sliders 13 move in the radial direction of the magnetic recording disks 12. Such radial movement allows the flying head slider 13 to be positioned right above the target data track on the surface of the magnetic recording disk 12. A magnetic transducer, not shown, mounted in the flying head slider 13 is adapted to trace circular data tracks for writing and reading information data into and out of the magnetic recording disk 12. It should be noted that any support member, such as a contact head slider, may be employed to support the transducer in place of the flying head slider.

Figure 2:
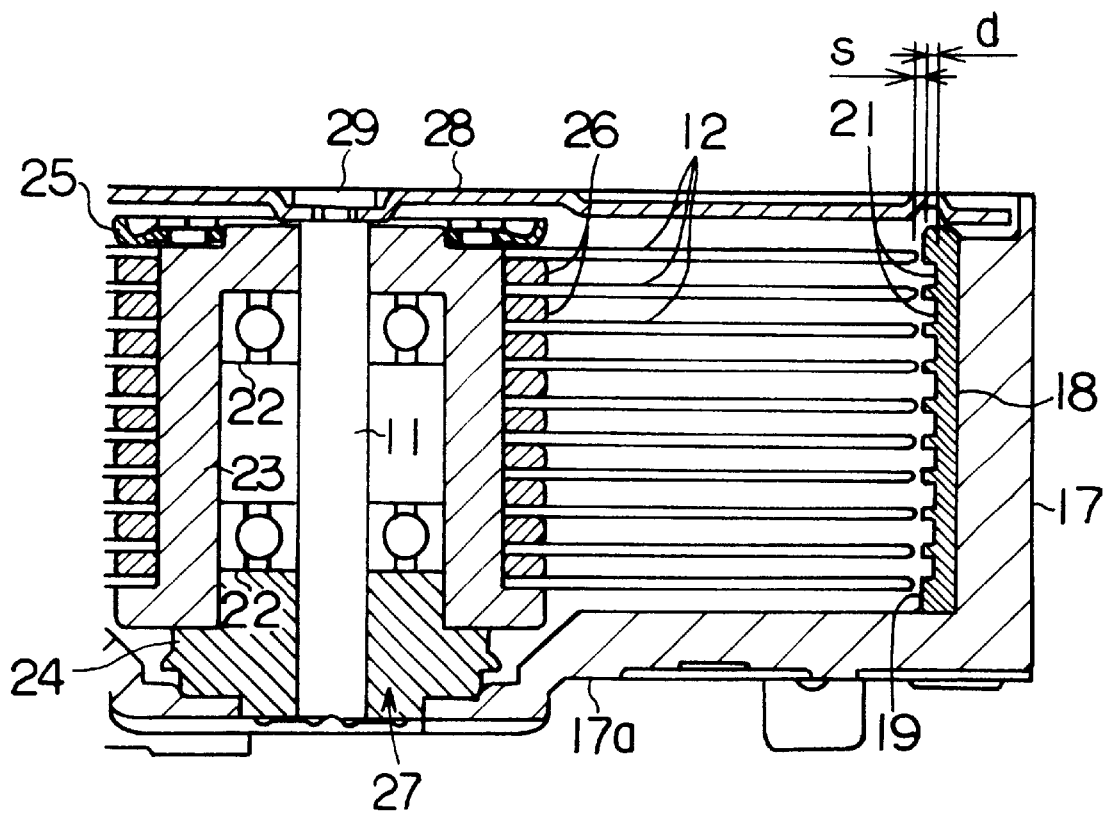
FIG. 2 is an enlarged view partly illustrating a section taken along the line 2—2 in FIG. 1.

A shroud member 18 is inserted into an enclosure 17 enclosing the magnetic recording disks 12. The shroud member 18 is designed to define a shroud wall 19 surrounding the magnetic recording disks 12. The shroud wall 19 is spaced from the peripheral ends of the magnetic recording disks 12. As shown in FIG. 2, stripes of rectification grooves 21 are formed in the shroud wall 19 at positions adjacent areas opposed to the respective peripheral ends of the magnetic recording disks 12. The shroud wall 19 is preferably opposed to the peripheral ends of the magnetic recording disks 12 at a wider circumferential area. Moreover, the rectification grooves 21 are preferably formed to extend entirely along the shroud wall 19 in the circumferential direction of the magnetic recording disk 12 without interruption, as described later in detail.

As is apparent from FIG. 2, upper and lower ball bearings 22 serve to support a rotor 23 for rotation around the support axis 11 fixed on a base plate 17a of a housing 17. An outer flange 24 is formed at the lower end of the rotor 23. Spacer rings 26 and the magnetic recording disks 12 are alternately placed on the outer flange 24. A clamp 25 is screwed on the tip or upper end of the rotor 23 so as to urge the spacer rings 26 and the magnetic recording disks 12 against the outer flange 24. The magnetic recording disks 12 are mounted on the rotor 23 in this manner. The spacer rings 26 serve to keep constant intervals between the respective adjacent magnetic recording disks 12. The rectification grooves 21 are respectively positioned at spaces between the constantly spaced magnetic recording disks 12. It is preferable that the rectification grooves 21 keep failing to be opposed to the peripheral ends of the respective magnetic recording disks 12 even if the spindle motor 27 drives the rotor 23 and the magnetic recording disks 12 for rotation. When the opening of the housing 17 is closed with a cover 28, a screw 29 serves to fix the cover 28 on the tip end of the support axis 11.

When the spindle motor 27 generates a drive force, the magnetic recording disks 12 rotate. The magnetic recording disks 12 may reach the rotational velocity of 10033 rpm, for example. Turbulence may be induced at a space between the shroud wall 19 and the magnetic recording disks 12. Flutter occurs at the rotating magnetic recording disks 12. The flutter causes sway or vibration in the direction orthogonal to the surface of the magnetic recording disk 12, namely, in the longitudinal direction. At the same time, such flutter causes a horizontal displacement or shift along the direction parallel to the surface of the magnetic recording disk 12 by a magnitude or amplitude equal to approximately 10% of the longitudinal sway. The horizontal displacement causes the flying head slider 13 to deviate from the target data track on the magnetic recording disk 12. Specifically, deviation of the flying head slider 13 from the target data track cannot be avoided even if the flying head slider 13 keeps flying at the constant flying height above the surface of the magnetic recording disk 12. The rectification grooves 21 serve to suppress the flutter.

Next, consideration will be made on the condition for efficiently reducing the flutter of the magnetic recording disk 12. Flutter has been measured for the magnetic recording disk 12 of 3 inches (84 mm) diameter rotating at the velocity of 10033 rpm, for example. Various sizes of gap $\underline{s}$ and depth $\underline{d}$ of the rectification grooves 21 have been selected. Here, the gap $\underline{s}$ is defined between the shroud wall 19 and the peripheral end of the magnetic recording disk 12, as shown in FIG. 2. The following result has been obtained.

| Gap s | Flutter [$\mu$m] | | |
|---|---|---|---|
| [mm] | d = 0 [mm] | d = 0.5 [mm] | d = 1.0 [mm] |
| 1 | 2.613 | 2.127 | 1.814 |
| 0.5 | 2.339 | 1.805 | 1.445 |

Figure 3:
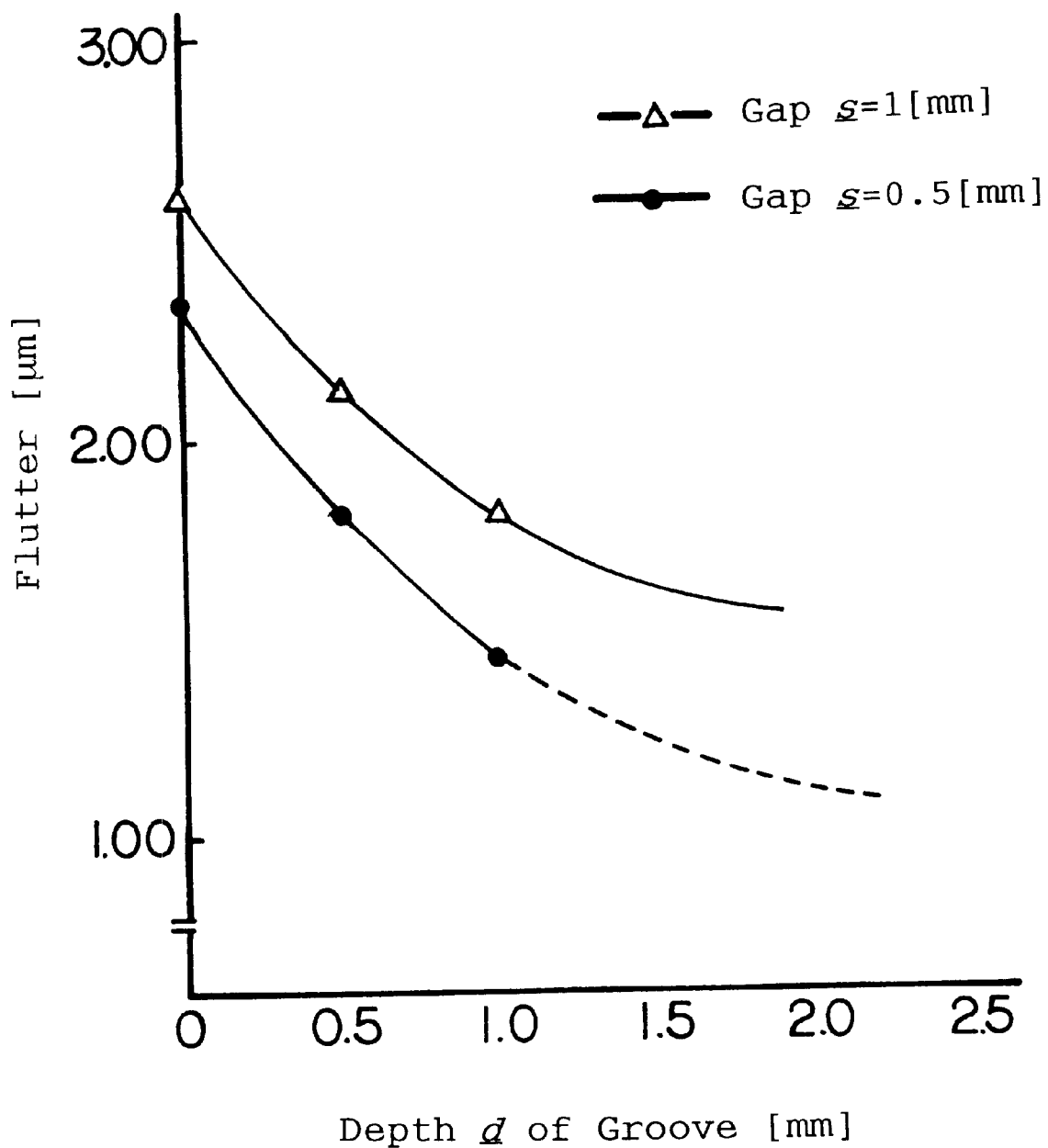
FIG. 3 is a graph illustrating the relationship between the flutter of the magnetic recording disk and the gap measured from the peripheral end of the disk to the shroud wall in view of the variation in depth of the rectification groove.

According to the result, when the gap $\underline{s}$ is reduced to 0.5 mm from 1.0 mm, the amplitude of flutter can reliably be suppressed in the entire range of the depth $\underline{d}$. Moreover, when the gap $\underline{s}$ extends by 0.5 mm, the flutter reduces at a higher rate in response to increase of the depth $\underline{d}$, as compared with the gap $\underline{s}$ of 1.0 mm, as shown in FIG. 3. Accordingly, if the shroud wall 19 keeps the gap $\underline{s}$ equal to or smaller than 0.5 mm against the peripheral end of the magnetic recording disk 12, the rectification groove 21 can be made shallower so as to still efficiently suppress the flutter of the magnetic recording disk 12.

On the other hand, as is apparent from FIG. 3, when the gap $\underline{s}$ extends by 0.5 mm, the rectification groove 21 of the depth $\underline{d}$ larger than 2.0 mm hardly suppresses or improves the flutter of the magnetic recording disk 12 anymore. Further reduction of the flutter cannot be expected even if the depth $\underline{d}$ of the rectification groove 21 is set larger than 2.0 mm. Specifically, even the rectification groove 21 of the depth $\underline{d}$ equal to or smaller than 2.0 mm suppresses the flutter enough.

Figure 4:
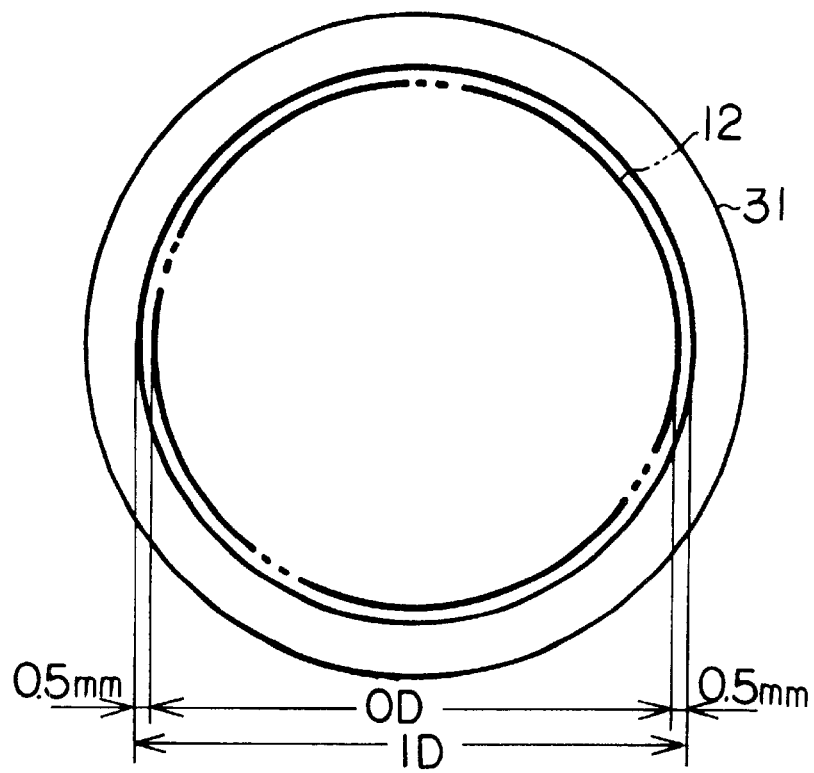
FIG. 4 is a plan view illustrating the end surface of the tubular material.

Next, description will briefly be made on the method of forming the shroud wall 19 of the aforementioned HDD 10. First of all, a tubular material 31 of annular cross-section is prepared. The tubular material 31 has constant inside and outside diameters at an entire length. As is apparent from FIG. 4, the inside diameter ID of the tubular material 31 is set larger than the outside diameter OD of the magnetic recording disk 12. The difference is set equal to or smaller than 1.0 mm between the inside diameter ID and the outside diameter OD. The tubular material 31 may be made from an aluminum material, for example.

Figure 5:
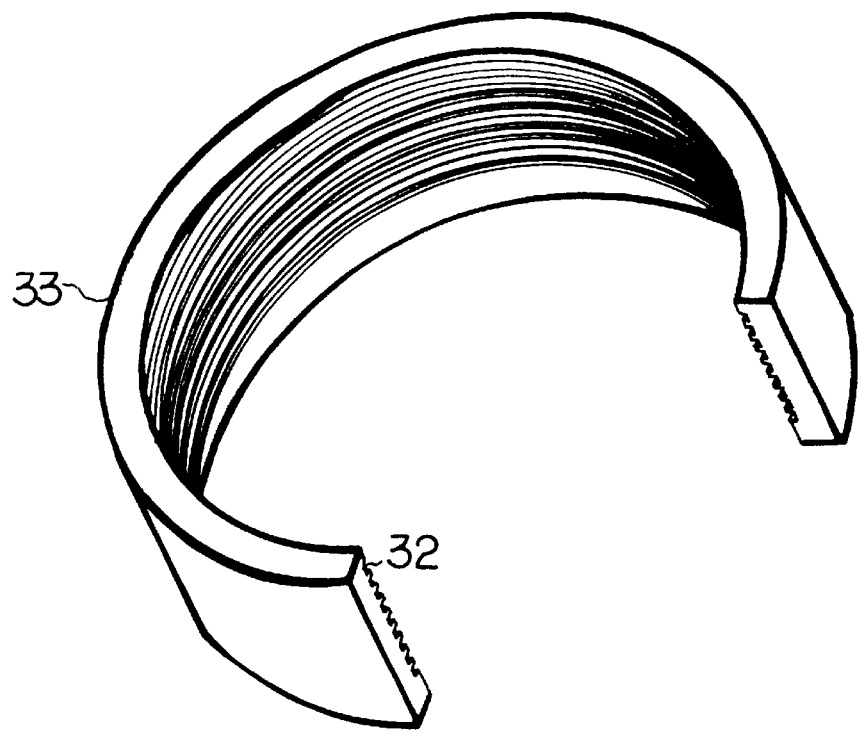
FIG. 5 is a perspective view illustrating an annular member cut off from the tubular material.

Annular grooves 32 are then formed on the inner surface of the tubular material 31. Boring machines may be employed to form the annular grooves 32. The respective grooves 32 extend in the circumferential direction of the tubular material 31. The annular grooves 32 of the depth equal to or smaller than 2.0 mm may contribute to reduction in processing or machining time and wastes. The grooves 32 are disposed at intervals corresponding to those between the respective magnetic recording disks 12. An annular member 33 is thereafter cut off from the tubular material 31, as shown in FIG. 5. The annular member 33 includes the annular grooves 32 at its inner surface. A sector of a predetermined central angle is then cut out from the annular member 33. The central angle is preferably set equal to or smaller than 90 degrees.

The annular member 33 with a gap, namely, the shroud member 18 is then set or inserted in the enclosure 17 of an aluminum material. Die casting may be employed to form the aluminum enclosure 17. When the spindle motor 27 and magnetic recording disks 12 are finally assembled in the enclosure 17, as shown in FIG. 2, the shroud member 18 allows its inner surface to be opposed to the peripheral ends of the magnetic recording disks 12 at positions adjacent the remaining annular grooves 32, namely, the rectification grooves 21.

It should be noted that the rectification grooves 21 may be formed not only on the shroud member 18 as mentioned above but also on the enclosure 17 along with the shroud wall 19.

What is claimed is:

1. A recording disk drive comprising:

a recording disk having front and back surfaces;

a shroud wall spaced from a peripheral end of the recording disk by a gap equal to or smaller than 0.5 mm; and a rectification groove formed in the shroud wall at a position outside an area defined between planes respectively including said front and back surfaces.

2. The recording disk drive according to claim 1, further comprising:

an enclosure enclosing the recording disk; and a shroud member inserted into the enclosure to define the shroud wall with the rectification groove.

3. The recording disk drive according to claim 1, wherein the rectification groove has a depth equal to or smaller than 2 mm.

4. The recording disk drive according to claim 3, further comprising:

an enclosure enclosing the recording disk; and a shroud member inserted into the enclosure to define the shroud wall with the rectification groove.

5. The recording disk drive according to claim 1, wherein a rotational velocity of the recording disk is set at a level equal to or larger than 10,000 rpm.

6. A recording disk drive comprising:

a recording disk having front and back surfaces;

an enclosure enclosing the recording disk;

a shroud member inserted into the enclosure so as to keep a gap equal to or smaller than 0.5 mm to a peripheral end of the recording disk; and a rectification groove formed in the shroud member at a position outside an area defined between planes respectively including said front and back surfaces.

7. The recording disk drive according to claim 6, wherein the rectification groove has a depth equal to or smaller than 2 mm.

8. The recording disk drive according to claim 6, wherein a rotational velocity of the recording disk is set at a level equal to or larger than 10,000 rpm.

* * * * *